US006944272B1

(12) United States Patent
Thomas

(10) Patent No.: US 6,944,272 B1
(45) Date of Patent: Sep. 13, 2005

(54) METHOD AND SYSTEM FOR ADMINISTERING MULTIPLE MESSAGES OVER A PUBLIC SWITCHED TELEPHONE NETWORK

(75) Inventor: John H. Thomas, Kansas City, MO (US)

(73) Assignee: Interactive Intelligence, Inc., Indianapolis, IN (US)

( * ) Notice: Subject to any disclaimer, the term of this patent is extended or adjusted under 35 U.S.C. 154(b) by 0 days.

(21) Appl. No.: 10/050,284

(22) Filed: Jan. 16, 2002

Related U.S. Application Data

(60) Provisional application No. 60/261,893, filed on Jan. 16, 2001.

(51) Int. Cl.[7] ............................................. H04M 11/00
(52) U.S. Cl. ............................... 379/88.13; 379/88.17; 379/88.18; 379/88.25
(58) Field of Search .......................... 379/88.13, 88.17, 379/88.18, 88.23, 88.25, 84, 88.04, 88.14, 379/93.24

(56) References Cited

U.S. PATENT DOCUMENTS

| | | | | |
|---|---|---|---|---|
| 4,602,129 A | * | 7/1986 | Matthews et al. | ........ 379/88.26 |
| 5,377,354 A | * | 12/1994 | Scannell et al. | ............ 709/103 |
| 5,647,002 A | * | 7/1997 | Brunson | ..................... 709/206 |
| 5,717,742 A | | 2/1998 | Hyde-Thomson | |
| 5,796,394 A | | 8/1998 | Wicks et al. | |
| 5,870,549 A | * | 2/1999 | Bobo, II | ..................... 709/206 |
| 5,905,774 A | * | 5/1999 | Tatchell et al. | .......... 379/88.04 |
| 5,917,489 A | | 6/1999 | Thurlow et al. | |
| 5,948,059 A | | 9/1999 | Woo et al. | |
| 5,951,638 A | | 9/1999 | Hoss et al. | |
| 5,960,395 A | * | 9/1999 | Tzirkel-Hancock | ......... 704/241 |
| 5,999,967 A | | 12/1999 | Sundsted | |
| 6,069,940 A | * | 5/2000 | Carleton et al. | ......... 379/88.04 |
| 6,073,165 A | | 6/2000 | Narasimhan et al. | |
| 6,148,287 A | * | 11/2000 | Yamakita | ..................... 704/275 |
| 6,233,318 B1 | * | 5/2001 | Picard et al. | ............ 379/88.17 |
| 6,301,608 B1 | | 10/2001 | Rochkind | |
| 6,373,926 B1 | * | 4/2002 | Foladare et al. | ......... 379/88.13 |
| 6,603,837 B1 | * | 8/2003 | Kesanupalli et al. | ..... 379/88.17 |
| 6,640,242 B1 | * | 10/2003 | O'Neal et al. | ............. 709/206 |
| 6,697,458 B1 | * | 2/2004 | Kunjibettu | ............... 379/88.17 |

OTHER PUBLICATIONS

Interactive Intelligence "Truly Unified Messaging" White Paper by Matt Taylor, Jun. 2, 1997.
Interactive Intelligence "Service Interaction Center™ Technical Overview" White Paper by Dr. Donald E. Brown, Oct. 24, 2000.

* cited by examiner

*Primary Examiner*—Fan Tsang
*Assistant Examiner*—Simon Sing
(74) *Attorney, Agent, or Firm*—Woodard, Emhardt, Moriarty, McNett & Henry LLP

(57) ABSTRACT

A unified messaging system is configured to store and retrieve email, facsimile, pager, and voicemail messages. A telephone operated by a person is operatively coupled over a public switched telephone network to the unified messaging system. The system receives over the public switch telephone network a signal from the telephone corresponding to an administer multiple messages command for multiple messages having a common trait. In one form, the multiple messages having the common trait are then deleted from the database in response to this command. In another form, the multiple messages are filed into a folder specified by the person.

31 Claims, 7 Drawing Sheets

| Message Id. | Message Type | Date / Time | Sender | Recipient | Subject | Message Body |
|---|---|---|---|---|---|---|
| 1 | Fax | 01-Jan-2000 10:21:43 | (123) 456 - 7890 | Cathy Doe | Meeting | xxx |
| 2 | Email | 03-Jan-2000 08:07:03 | JDoe@Doe.com | CDoe@Smith.com BSmith@Smith.com | Sales | xxx |
| 3 | Voicemail | 25-Jan-2000 13:38:58 | Bob Smith | Mary Doe, Cathy Doe | Meeting | xxx |
| 4 | Page | 14-Feb-2000 03:02:35 | (987) 654 - 3210 | Ann Jones | | xxx |
| 5 | Voicemail | 15-Mar-2000 11:12:26 | Ext.123 | Ext.456; Ext.789 | Report | xxx |

Fig. 3

| 402 | 404 | 406 | 408 | 410 |
|---|---|---|---|---|
| Name | Phone Number | Fax Number | Email | Address |
| Pat Jones | (123) 456 - 7891 | (123) 456 - 7890 | PJones@Jones.com | 111 River Road |
| Cathy Doe | Ext. 456 | (123) 571 - 1131 | CDoe@Smith.com | 123 Main St. |
| Smith Industries | (135) 123 - 4567 | (135) 123 - 4569 | Smith@Smith.com | 234 1st St. |

Fig. 4

METHOD AND SYSTEM FOR ADMINISTERING MULTIPLE MESSAGES OVER A PUBLIC SWITCHED TELEPHONE NETWORK

CROSS-REFERENCE TO RELATED APPLICATIONS

The present application claims the benefit of commonly owned U.S. Provisional Patent Application No. 60/261,893, filed 16 Jan. 2001, which is hereby incorporated by reference in its entirety.

BACKGROUND OF THE INVENTION

The present invention generally relates to unified messaging systems, and more specifically, but not exclusively, concerns a unified messaging system in which multiple messages can be administered with a telephone over a public switched telephone network.

Unified messaging systems are used to store different types of messages, such as emails, voicemails and faxes, in one location. Subscribers to the unified messaging system can conveniently retrieve their email, voicemail, and fax messages by using a telephone, a computer, or a facsimile machine. One problem created by this convenience of having the messages stored in one location is that the inbox of a subscriber can become quickly inundated with a large number of duplicate or unsolicited messages.

Although predefined filters can be used to filter out unsolicited email messages and/or redirect specified email messages, the filter may not be easily modified to handle new conditions, such as duplicate messages from a new source. This filtering problem is especially of concern when the subscriber is away from the office. In this situation, the subscriber typically does not have access to a computer and must use a telephone to retrieve the messages. When the subscriber has a large number of messages, the subscriber can be quickly frustrated by having to individually listen to and administer each message with the telephone. Therefore, there has been a long-felt need for a unified messaging system in which a subscriber can easily administer multiple messages at the same time using a telephone over a public switched telephone network.

SUMMARY OF THE INVENTION

One form of the present invention is a unique method for processing multiple messages for a unified messaging system over a public switched telephone network. Other forms concern unique methods, systems, and apparatus for administering multiple messages over a public switched telephone network.

In a further form, a computer is configured to store messages in a database. The computer is operatively coupled over a public switched telephone network to a telephone operated by a person. A command from the telephone is received over this network to administer multiple messages having a common trait. The multiple messages having the common trait are administered in the database in response to this command.

Another form concerns a unique unified messaging system. The system includes a means for storing messages. The system further includes a means for receiving over a public switched telephone network a signal from a telephone corresponding to an administer multiple messages command for multiple messages having a common trait. This system further includes means for administering the multiple messages having the common trait in response to the administer multiple messages command.

Still yet another form concerns a unique apparatus. The apparatus includes a computer-readable device encoded with a program executable by a computer to store messages. The program is further executable to receive from a telephone public switched network an input corresponding to a selection of multiple messages for administration that have at least one common trait. The program is executable to administer the selected multiple messages in the stored messages in response to the input.

Another form of the present invention includes a system that comprises a database containing a number of messages and a processor operatively coupled to the database. The processor is responsive to an input over a public switched network from a telephone. The input corresponds to a command for selected multiple messages in the database, and the processor is operable to administer the selected multiple messages in the database.

Other forms, embodiments, objects, features, advantages, benefits and aspects of the present invention shall become apparent from the detailed drawings and description contained herein.

BRIEF DESCRIPTION OF THE DRAWINGS

FIG. 3 shows a diagrammatic view of a message table for the system of FIG. 1.

FIG. 4 shows a lookup table for the system of FIG. 1.

DESCRIPTION OF SELECTED EMBODIMENTS

Figure 1:
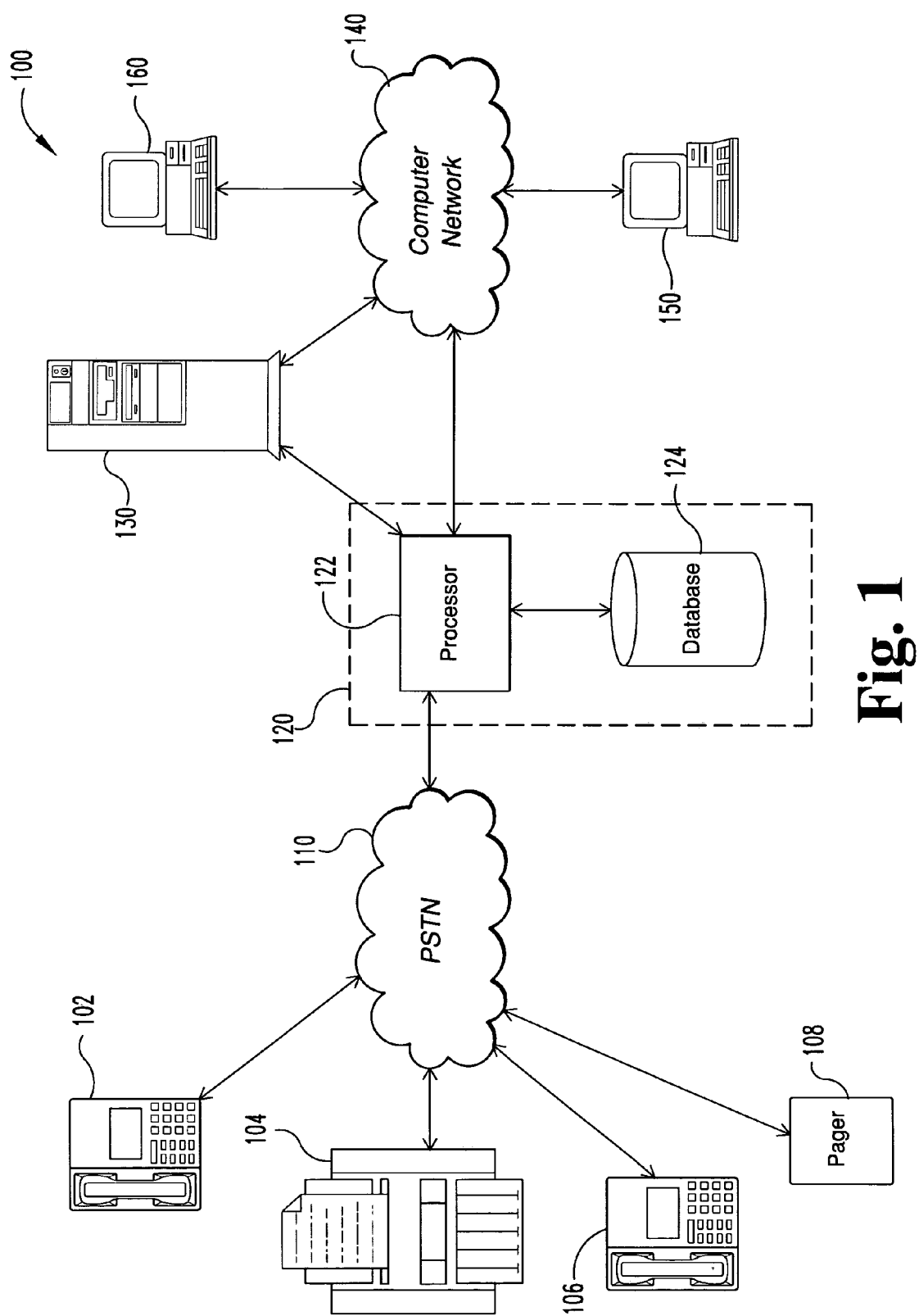
FIG. 1 is a diagrammatic view of a communications system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the art that some of the features which are not relevant to the invention may not be shown for the sake of clarity.

In one embodiment of the present invention, a subscriber reviews messages stored in a unified messaging system over a public switched telephone network by using a telephone. After hearing the message on the telephone, the subscriber can delete multiple messages based on a common trait shared between the multiple messages, such as the subject or sender of the messages. In another form, the subscriber is able to delete the multiple messages without having to listen to a message. The unified messaging system in a further form allows the subscriber over the telephone to file multiple messages sharing at least one common trait into a designated file.

FIG. 1 depicts a communication system 100 according to one embodiment of the present invention in diagrammatic form. The communication system includes a subscriber telephone 102, a facsimile machine 104, a caller telephone 106, and a pager 108 that are operatively coupled to a public switched telephone network 110 (PSTN). A unified messaging system 120 is operatively coupled to the public switched telephone network 110. The unified messaging system 120 includes a processor 122 and a database 124 that is operatively coupled to the processor 122. The unified messaging system 120 is further operatively coupled to an email server 130, and both the unified messaging system 120 and the email server 130 are operatively coupled to computer network 140. An outside computer 150 and a subscriber computer 160 are also operatively coupled to computer network 140.

The telephones 102, 106 can be of any type generally known by those skilled in the art, such as standard land line varieties and wireless varieties. It should be appreciated that the telephones 102, 106 can be directly connected to the public switched telephone network 110 and/or indirectly through a wireless network. The facsimile machine 104 can be a standard facsimile machine, a computer equipped with a fax-modem, and/or a different type of facsimile device as would occur to those skilled in the art. The pager 108 is of any variety generally known by those skilled in the art.

In one form, the unified messaging system 120 is incorporated into an automatic call distribution (ACD) system. The unified messaging system 120 can be located on a single server or distributed over several servers. The processor 122 of the unified messaging system 120 may be comprised of one or more components. For a multi-component form of the processor 122, one or more components can be located remotely relative to the others, or configured as a single unit. Furthermore, processor 122 can be embodied in a form having more than one processing unit, such as a multiprocessor configuration, and should be understood to collectively refer to such configurations as well as a single-processor based arrangement. One or more components of the processor 122 may be of the electronic variety defining digital circuitry, analog circuitry, or both. Processor 122 can be of a programmable variety responsive to software instructions, a hardwired state machine, or a combination of these. The database 124 can be a standard file, a combination of files, a standard database program, a relational database, a SQL (structured query language) database, and/or other type of data storage structure as generally known to those skilled in the art. In one embodiment, the database 124 is a MICROSOFT SQL SERVER (Microsoft Corporation, Redmond, Wash.). The database 124 is stored in a memory (not shown) associated with the processor 122. This memory can include one or more types of solid state memory, magnetic memory, or optical memory, just to name a few. By way of nonlimiting example, the memory can include solid state electronic random access memory (RAM), sequential accessible memory (SAM), such as first-in, first-out (FIFO) variety, or the last-in, first-out (LIFO) variety, programmable read only memory (PROM), electronically programmable read only memory (EPROM), or electrically erasable programmable read only memory (EEPROM); an optical disc memory (such as DVD or CD ROM); a magnetically encoded hard disk, floppy disk, tape, or cartridge media; or a combination of these memory types. In addition, the memory for the database 124 may be volatile, non-volatile, or a hybrid combination of volatile, non-volatile varieties.

The email server 130 is adapted to maintain multiple mailboxes for different subscribers. The email server 130 can be any type of email server as generally known by those skilled in the art. In one form, the email server 130 is a MICROSOFT EXCHANGE SERVER (Microsoft Corporation, Redmond, Wash.), and all the messages are stored in the email sever 130. The unified messaging system 120 has universal privileges so as to access all of the inboxes on the email server 130. However, it should be understood that the unified messaging system 120 can have more limited privileges relative to the email server 130. The unified messaging system 120 and the email server 130 communicate with one another in a manner as generally known by those skilled in the art, such as using ActiveX control technology.

It should be appreciated that instead of storing the messages in the email server 130, all of the messages can be stored in the database 124. It should be understood that the email server 130 and the unified messaging system 120 can be integrated into a single server or distributed over several servers. Further, the unified messaging system 120 can be connected to one or multiple email servers 130. In one form, the database 124 and the email server 130 are integrated together so as to form a single message database. In another form, the unified messaging system 120 and the email server 130 are loaded on separate severs in order to reduce the risk that messages will be lost if the email server 130 becomes inoperative.

Network 140 can include the Internet, one or more other wide area networks (WAN), a local area network (LAN), a proprietary network such as provided by American On Line, Inc., a combination of these, and/or a different type of network generally known to those skilled in the art. The computers 150, 160 can include a personal computer, a computer terminal, a personal digital assistant (PDA), and/or other types of devices generally known to those skilled in the art. The computers 150, 160 have software that allows the computers 150, 160 to communicate over the network 140. This software can include an email application, a web browser, a chat program, and other types of client software generally known to those skilled in the art. In one embodiment, the computers 150, 160 are personal computers having web browser and email client software.

The unified messaging system 120 is able to process and store different types of messages received through various channels. In the particular embodiment described below, all of the messages are stored as email messages on the email server 130. These stored email messages include fields as generally known by those skilled in the art, such as subject fields, sender name fields, date/time fields, and recipient fields. The stored messages further can include fields to indicate in which form the original message was sent (e.g., email, fax, and voicemail).

In operation, a person using the fax machine 104 can fax a message to the subscriber by sending the fax over the public switched telephone network 110. The processor 122 processes the fax and stores the fax as a message on the email server 130. In one form, the fax is stored in a pixelated, graphic form as a bitmap file attachment to the message and the sender name for the message is the fax machine telephone number. Alternatively or additionally, the processor 122 can use optical characteristic recognition (OCR) software to convert the fax transmission to a text message. Once the fax is converted to a text message, the processor 122 can then determine information, such as the name of the sender, the name of the recipient, and the subject of the message.

A person can leave a voicemail message for a particular subscriber or a group of subscribers by using the caller telephone 106. The processor 122 processes the incoming call, and if the called subscriber is not available, the unified messaging system 120 prompts the person to leave a voicemail message. In one form, the voicemail is stored as a sound file (such as a ".wav" file) and is attached to a message stored in the inbox for the subscriber on the email server 130. Alternatively or additionally, the processor 122 can use speech-to-text conversion software to convert the voicemail message to a text message for storage on the email server 130. A person using the caller telephone 106 can also page a subscriber with pager 108. If the pager 108 is not available, the page message is processed by processor 122 and is stored as a text (or voice) message on the email server 130.

Messages from a person can also be sent over the network 140 by using the computer 150. The messages sent from the computer 150 can be in the form of an email, an Internet telephone call, a chat request, a submitted web form, and/or other forms of communication as generally known by those skilled in the art. It should be appreciated that the messages from the network can be processed by the unified messaging system 120, the email server 130, or a combination of both. For example, in one embodiment, the email server 130 processes the email messages and the unified messaging system 120 processes the other forms of communication from the network 140.

A subscriber using the subscriber computer 160 can view or listen to the messages stored on the email server 130. When the subscriber is away from the subscriber computer 160, the subscriber uses the subscriber telephone 102 to access the messages stored on the email server 130. With the subscriber telephone 102, the subscriber places a call to the unified messaging system 120 and logs into the unified messaging system 120. Once the subscriber logs onto the unified messaging system 120, the processor 122 is able to identify the subscriber and retrieve the messages for the subscriber from the email server 130. The unified messaging system 120 has a voice menu system that is used by the subscriber to navigate through the system 120. For example, a subscriber using the telephone 102 can use the touch tone keys on the subscriber telephone 102 to navigate within the unified messaging system 120. It is further contemplated that the unified messaging system 120 can accept voice commands from the subscriber.

When a subscriber initially checks the messages, the unified messaging system 120 tells the subscriber how many emails, voice mail messages, faxes, and pages the subscriber has (e.g., "You have 4 email messages, 2 voicemail messages, and 1 fax message"). When the subscriber selects to listen to the messages, the processor 122 retrieves the messages for the particular subscriber one at a time from the email server 130. The unified messaging system 120 transmits the messages over the public switched telephone network 110 to the subscriber telephone 102. If for example the message is a text message, such as an email or an OCR converted fax, the processor 122 uses text-to-speech conversion software to convert the text of the message to speech so that the subscriber can listen to the message. If the message on the other hand is a voicemail message and/or contains a sound file, the processor 122 plays the voicemail message and/or the sound file.

Figure 2:
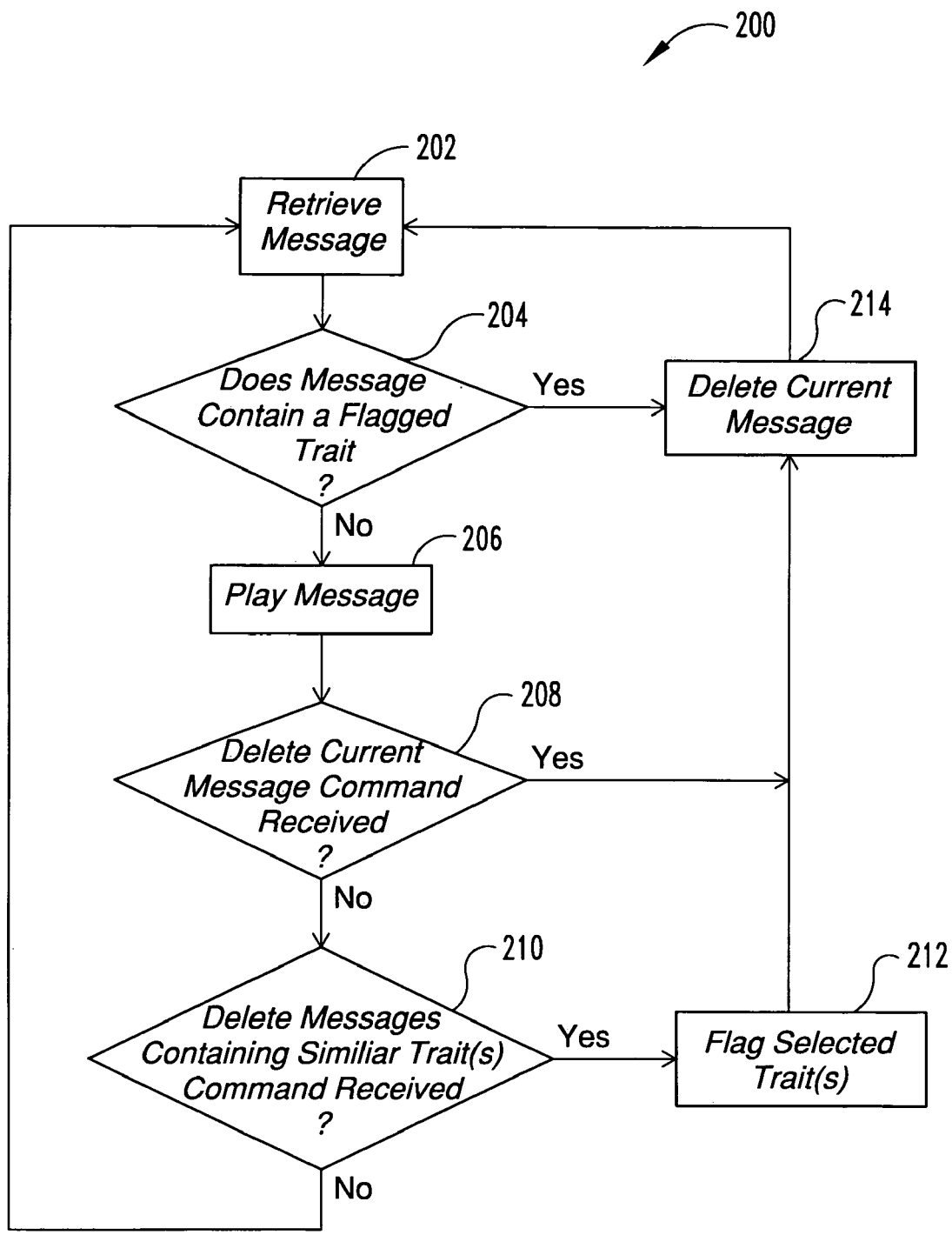
FIG. 2 is a flow diagram illustrating one process for deleting multiple messages from a unified messaging system over a public switched telephone network.

A method for deleting multiple messages over the public switched telephone network 110 with the subscriber telephone 102 according to one embodiment of the present invention will now be described with reference to flow diagram 200 shown in FIG. 2. When a subscriber wishes to review the messages stored on email server 130, the processor 122 in stage 202 retrieves one message from the email server 130. Once the message is retrieved from the email server 130, the processor 122 using the database 124 determines if a particular trait in the message has been flagged in stage 204. Initially, when the subscriber listens to the first message no traits are flagged in the database 124. Traits of the message can include the type of message, such as a fax, email, voice mail, page, etc.; the date/time when the message was received; the sender of the message; the recipient (s) of the message; the subject of the message; particular words contained in the message; or any combination of these.

When the message does not contain any of the flagged traits stored in the database 124, the processor 122 plays the message to the subscriber telephone 102 in stage 206. After the message is played, the subscriber can delete the single message or command the unified messaging system 120 to delete all messages having the same selected trait(s) as the played message. If the unified messaging system 120 receives a delete current message command from the subscriber telephone 102, the unified messaging system 120 deletes the previously played message (stage 214). The message is deleted from the unified messaging system 120 in a manner as generally known by those skilled in the art. In one form, a pointer to the message is changed so as to indicate that the message has been read. In another form, the message is removed from the database 124. It should be appreciated that the messages can be deleted in other generally known manners. In stage 210, when the unified messaging system 120 receives a command instructing the system 120 to delete messages containing a trait or traits similar to the previously played message, the processor 122 stores in stage 212 the trait(s) in the database 124. Following stage 212, the unified messaging system 120 deletes the current message in stage 214 and retrieves the next message from the email server 130 in stage 202. So for example, if the played message is from "John Smith" and the subscriber selects to delete all messages from the same sender, then all messages from "John Smith" will be deleted from the inbox of the subscriber. After deleting the messages, the unified messaging system 120 can indicate to the subscriber that the messages have been deleted (e.g., "All messages from John Smith have been deleted"). If no delete multiple messages command is received in stage 210, the unified messaging system 120 then retrieves the next message in stage 202.

When the next message is retrieved in stage 202, if the retrieved message in stage 204 contains the flagged trait (e.g., sender is "John Smith"), then the current message is deleted in stage 214 and the message is not played. The processor 122 then in stage 202 retrieves the next message, and this process continues until all the messages have been reviewed. The above-described deletion method provides a simple interface between the unified messaging system 120 and the email server 130, and administration of the messages does not depend on the capabilities of the email server 130. If the connection between the unified messaging system 120 and the subscriber telephone 102 is prematurely disconnected, the processor 122 discontinues retrieving and deleting messages, and the database 124 is purged of all of the flagged traits. In another form, once the subscriber is no longer connected to the unified messaging system 120, the processor 122 continues to retrieve and delete the messages of the subscriber until all of the messages have been processed. Instead of the processor 122 deleting one message at a time from the email server 130, the processor 122 in another form deletes all of the messages having similar traits from the email server 130 at the same time. It should be appreciated that the above-described method can be used delete messages from other folders (directories) besides the inbox of the subscriber. Further, it should be understood that the above-described method can be modified to forward similar messages.

An example of a command interface for designating the messages to delete according to one form of the present invention will now be described. After or while the message is played in stage 206, the subscriber can enter a delete command. The unified messaging system 120 waits to receive the delete command for a specified period of time (e.g., 5 seconds) after the message is played. Instead of using a time delay to enter commands, the subscriber can press the "#" key on the subscriber telephone 102 to indicate that the delete command is complete. In order to delete only the previously played message, the subscriber just presses the "7" touch-tone key on the subscriber telephone 102 (stage 208). If, for example, the subscriber presses the "7" and "1" keys on the subscriber telephone 102, the unified messaging system 120 will flag to delete all messages containing the same subject as the previously played message. Table 1 (below) lists exemplary key combinations and the corresponding commands (traits to flag).

TABLE 1

| KEY(S) | COMMAND |
|---|---|
| 7 | Delete current message only. |
| 71 | Delete messages containing the same subject. |
| 72 | Delete messages from the same sender. |
| 73 | Delete messages containing the same recipients. |
| 74 | Delete same type of messages. |
| 75 | Delete messages received on the same date. |
| 76 | Delete messages with bodies containing the same text. |

It should be appreciated that other key combinations can be used for the commands and other traits can be designated besides the ones shown. Further, multiple traits from the played message can be used in order to select the multiple messages marked for deletion. For example, the subject and the sender of the played message can be flagged by pressing the "7", "1", and "2" keys so that messages containing the same subject and sender will be deleted. In another form, voice commands are used in order to designate the multiple messages to delete from the unified messaging system 120.

An example of a message table 300 in which the messages are stored in the email server 130 is shown in FIG. 3. It should be appreciated that the message table 300 can be stored as a single table, in multiple tables and/or in other combinations generally known by those skilled in the art. The message table 300 includes a message identification number field 302, a message type field 304, a date/time field 306, a sender field 308, a recipient field 310, a subject field 312, and a message body 314. The fields in the message table 300 are used as message traits for administering the messages. It should be appreciated that the message table 300 can include other generally known fields and/or omit certain fields. The message ID field 302 is used to identify the particular message. The message type field 304 is used to indicate how the original message was sent, whether by fax, email, voicemail, page, or by some other manner. The date/time field 306 is used to indicate when the message was received, and the sender field 308 is used to identify who sent the message. The message body field 314 contains the body of the message.

When a message is received over the public switched telephone network 110, the processor 122 stores the caller identification number (if available) in the sender field 308. Likewise, the extension number for internal voicemail messages are stored in the sender field 308. The recipient field 310 can include the email addresses of the recipients of the message, the extension numbers of the recipients, the telephone numbers of the recipients, and other types of generally known identification information. For faxes, the subject field 312 and the other fields can be determined using the OCR software. For voicemail, the unified messaging system 120 can prompt the person leaving a voicemail message to fill in the above-described fields such as the subject field 312. The unified messaging system 120 then uses speech-to-text conversion software in order to fill text into the fields for the voicemail message.

As shown in FIG. 4, the unified messaging system 120 in one form stores in the database 124 a lookup table 400 for identifying senders and recipients of the messages. The lookup table 400 includes a name field 402, a phone number field 404, a fax number field 406, an email field 408, an address field 410, and other types of generally known identification fields. The unified messaging system 120 identifies the name of a particular person based on the caller identification number, and the unified messaging system 120 then stores the name of sending party in the sender field 308 in the message table 300. The processor 122 compares the information in the message in the sender 308 and recipient 310 fields with the lookup table 400 to determine the name of the person(s) and/or organization(s). This feature allows the subscriber to delete all of the message from a particular person, even if that person has sent different types of messages, such as an email and a fax. For example, as shown in FIG. 4, "Pat Jones" has "(123) 456–7890" as a fax number, and as shown in FIG. 3, the fax message for message identification number "1" has a sender of "(123) 456–7890." The unified messaging system 120 then can infer that "Pat Jones" sent the fax and use this information when administering the messages. It should be appreciated that the unified messaging system 120 can use this lookup table 400 for identification when the message is received, retrieved, or at other times.

Figure 5:
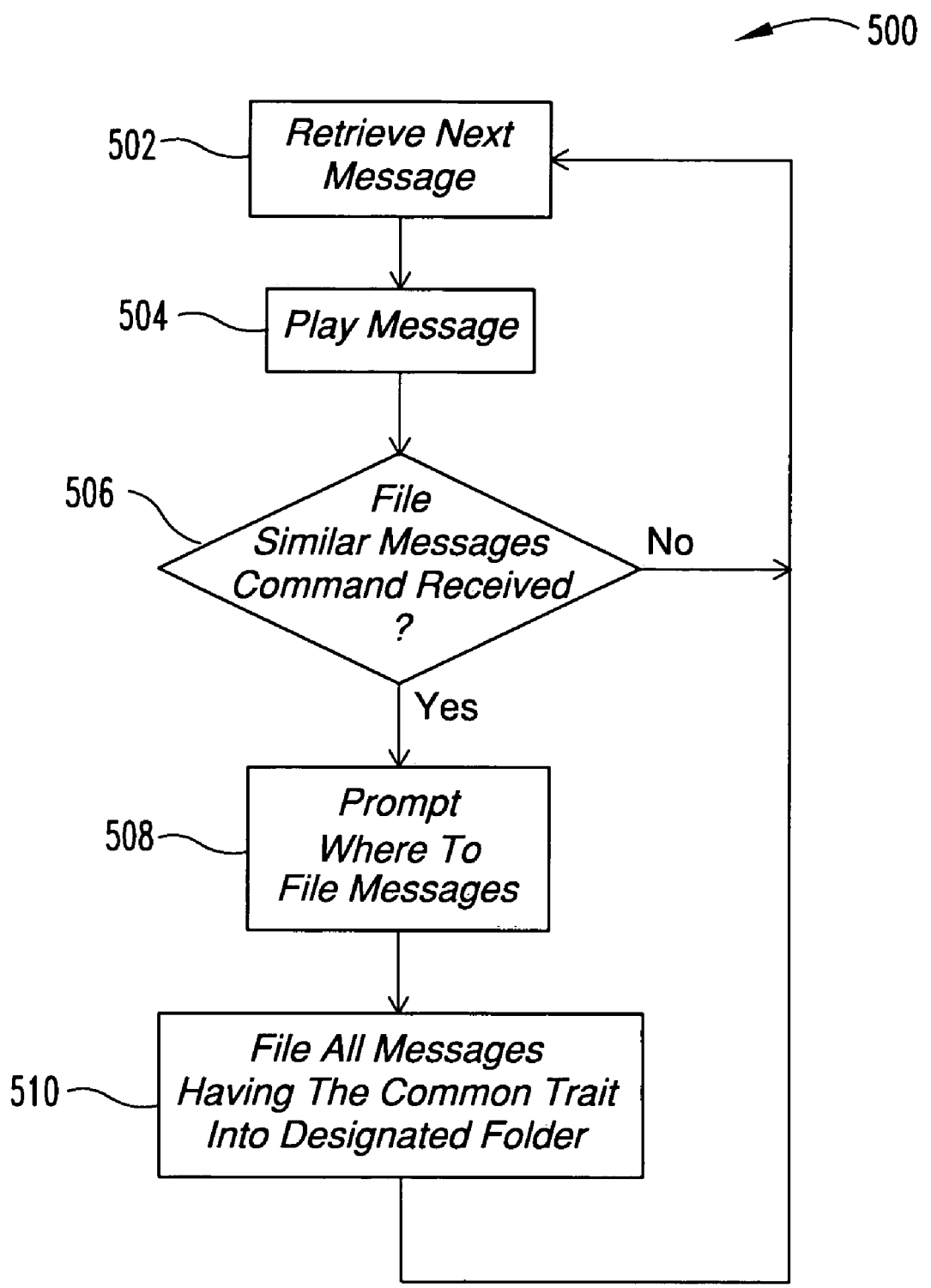
FIG. 5 is a flow diagram illustrating one process of transferring multiple messages to a designated folder with a telephone over the public switched telephone network.

A method for filing messages into selected folders (directories) through the subscriber telephone 102 will now be described in reference to flow diagram 500 shown in FIG. 5. This method allows a subscriber to file multiple messages having at least one common trait into designated folders using the subscriber telephone 102. In stage 502, the processor 122 retrieves a message from the email server 130. The unified messaging system 120, in stage 504, transmits the message over the public switched telephone network 110 to the subscriber telephone 102. After or while the message is played, the subscriber can send a file similar messages command to the unified messaging system 120 in stage 506. In one form, the subscriber enters the command using the touch-tone keys on the subscriber telephone 102. It should be understood that the command can also be entered using voice commands. Table 2 (below) is an exemplary list of touch-tone key combinations and the corresponding commands.

TABLE 2

| KEY(S) | COMMAND |
| --- | --- |
| 8 | File current message only. |
| 81 | File messages containing the same subject. |
| 82 | File messages from the same sender. |
| 83 | File messages containing the same recipients. |
| 84 | File same type of messages. |
| 85 | File messages received on the same date. |
| 86 | File messages with bodies containing the same text. |

If the processor 122 does not receive the file similar messages command from the subscriber telephone 102, then the next message is retrieved in stage 502. However, if the file similar messages command is received, the unified messaging system 120 in stage 508 prompts the subscriber to select a file folder in which to file the messages. In one embodiment, the unified messaging system transmits a voice menu list to the subscriber telephone 102 listing the folder names of the folders stored on the email server 130 and corresponding numbers, which are used to select a particular folder. For example, one such voice menu list can be "press 1 to store the messages in the personal folder, and press 2 to store the messages in the contact folder." The subscriber selects the folder by pressing the corresponding key on the keypad of the subscriber telephone 102.

After the subscriber indicates in which folder to file the messages, the processor 122 instructs the email server 130 in stage 510 to file all the messages having the common trait into the designated folder. Afterwards, the unified messaging system 120 retrieves the next message. It should be appreciated that instead of filing all the messages at once, the messages can be filed individually when each message is retrieved (see FIG. 2). Further, the above-described method shown in flow diagram 500 can be adapted to delete messages by sending the message to a "trash bin" folder, in which the messages contained in the trash bin are deleted. It should be appreciated that the above-described method can also be adapted to forward selected message to other subscribers.

Figure 6:
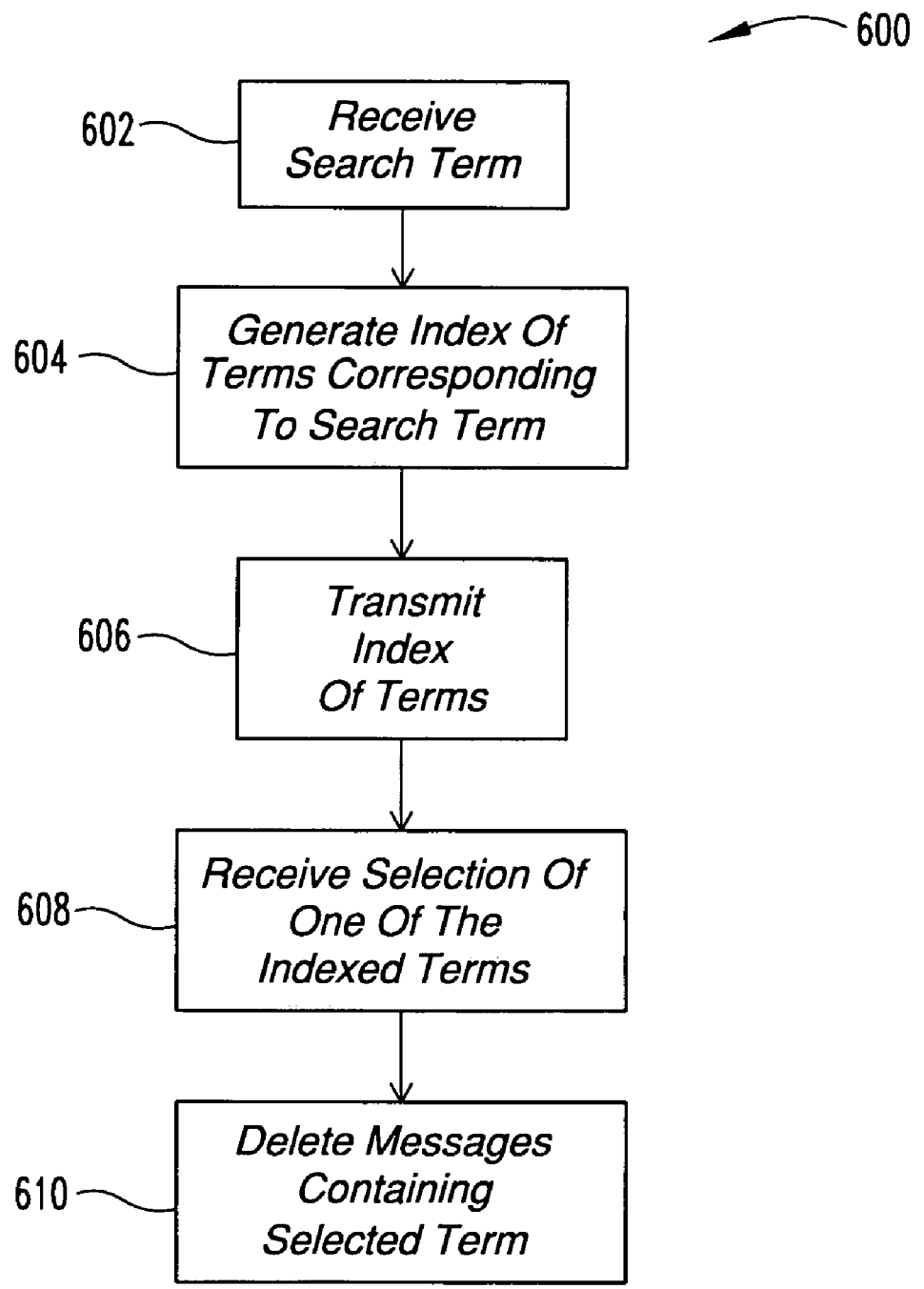
FIG. 6 is a flow diagram illustrating another process for deleting multiple messages from the unified messaging system over the public switched telephone network.

In another embodiment that is illustrated in flow-chart 600 (FIG. 6), the subscriber can administer designated messages before having to review the messages. Before the subscriber reviews the messages, the subscriber can enter in a search term using the subscriber telephone 102. In one embodiment, the subscriber enters the search term using the keypad on the subscriber telephone 102. The subscriber spells out the search term by pressing the keys having the corresponding letters. So for example, if the subscriber wanted to enter the word "CAT" as a search term, the subscriber would sequentially press the "2", "2" and "8" keys on the subscriber telephone 102. If the subscriber telephone 102 does not show the "Q" and "Z" letters on the keypad, the "7" key is used to represent the letter "Q" and the "9" key is used to represent the letter "Z." Once the subscriber finished keying in the search term on the keypad, the subscriber can press the "#" key to indicate that the search term is complete.

After the search term is entered, the processor 122 in stage 604 searches the messages stored in the email server 130 for terms corresponding to the entered search term. Since each key on the keypad includes multiple letters, words other than the search term can match a specific key combinations by the subscriber. For example, the words "CAT" and "BAT" are both spelled by sequentially pressing the "2", "2" and "8" keys. To solve this problem, the unified messaging system 120 in stage 604 generates an index of possible search terms from the messages stored on the email server 130 and stores the index in the database 124. In stage 606, the unified messaging system 120 transmits the index of possible search terms to the subscriber telephone 102. In one embodiment, the index of possible search terms is a voice menu list of terms and corresponding numbers. The subscriber in stage 608 selects one of the indexed terms by pressing the corresponding number(s) on the keypad of the subscriber telephone 102. In stage 610, the processor 122 deletes the messages containing the selected search term in a manner corresponding to the above-described methods. It should be understood that instead of deleting the messages, the unified messaging system 120 can file the messages containing the selected search terms into a designated folder. It should be appreciated that a menu system can be used in conjunction with the entered search term in order to limit the search to specific fields in the messages.

Figure 7:
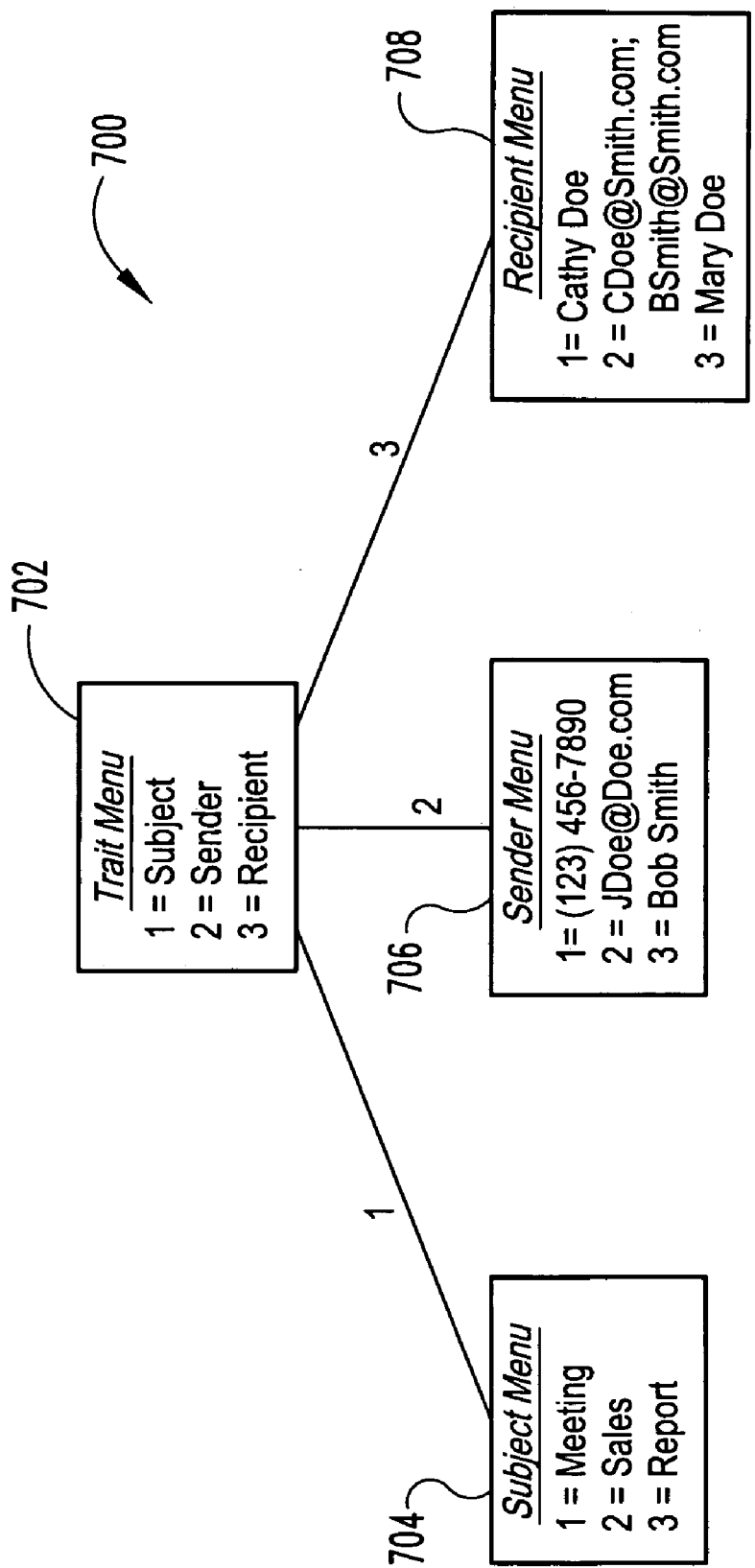
FIG. 7 is a diagram of hierarchical voice menus used for administering multiple messages for the system of FIG. 1.

In another embodiment, the subscriber can administer multiple messages having a common trait using the subscriber telephone 102 before listening to the messages. A hierarchical voice menu diagram 700 according to this embodiment is shown in FIG. 7. When a subscriber wishes to delete a message beforehand, the processor 122 transmits a trait selection voice menu 702 to the subscriber telephone 102. The trait menu 702 lists particular traits and corresponding numbers for designating the common traits.

Once a specific trait is selected, the processor 122 indexes the message list 300 in order to generate index of terms for the particular trait. For example, if the subscriber presses the "1" key, the processor 122 indexes the messages based on subject and then presents the subscriber with a subject voice menu 704. If the subscriber presses the "2" key, then the processor 122 indexes the messages based on the sender and transmits a sender voice menu 706 to the subscriber telephone 102, and if the "3" key is pressed on the subscriber telephone 102, then a recipient voice menu 708 is sent. For example, as shown in the subject menu 704, the subject fields 312 of the messages contain the terms "Meeting", "Sales" and "Report" (see FIG. 3).

The subscriber selects the common trait by selecting the number corresponding to the desired trait. For example, as shown, the subscriber presses the "2" key to select the "Sales" trait. Once the subscriber presses the corresponding key, messages containing that particular trait are then either deleted from the email server 130 or filed into a designated folder depending on the wishes of the subscriber. It should be appreciated that the menu 700 can include submenus to further define the particular message to delete. For example, under the subject menu 704, the subscriber could be presented with the sender menu 706 or the recipient menu 708 in order to further define the particular messages to delete. Further, it should be understood that voice input can be used instead of pressing the keys on the subscriber telephone 102.

While specific embodiments of the present invention have been shown and described in detail, the breadth and scope of the present invention should not be limited by the above described exemplary embodiments, but should be defined only in accordance with the following claims and their equivalents. All changes and modifications that come within the spirit of the invention are desired to be protected.

What is claimed is:

1. A method of deleting email messages sharing a common trait over a public switched telephone network independently of email system capabilities, comprising:
   operating a unified messaging system that is operatively coupled to an email server, wherein the unified messaging system is operatively coupled to a telephone by the public switched telephone network, wherein the unified messaging system is configured to process voicemail and email messages;

playing a first message from the unified messaging system over the public switched telephone network on the telephone;

receiving a command from the telephone instructing the unified messaging system to delete all messages that have the common trait with the first message;

deleting the first message with the unified messaging system;

retrieving a second message from the email server that is different from the first message, wherein the second message includes an email that has the common trait with the first message;

determining with the unified messaging system that the second message has the common trait with the first message; and deleting the second message from the email server in response to said determining;

retrieving a third message from the email server that is different from the first message, wherein the third message includes an email that has the common trait with the first message;

recognizing with the unified messaging system that the third message has the common trait with the first message; and deleting the third message from the email server in response to said recognizing.

2. The method of claim 1, comprising:

determining fourth message from the email server does not have the common trait with the first message after said deleting the second message; and playing the fourth message on the telephone after said determining the fourth message from the email server does not have the common trait with the first message.

3. The method of claim 1, wherein the first message includes a voicemail message.

4. The method of claim 1, wherein the first message includes an email message.

5. The method of claim 4, further comprising converting text of the first message to speech prior to said playing the first message.

6. The method of claim 1, wherein said receiving the command from the telephone includes receiving a touch-tone signal from the telephone.

7. The method of claim 1, wherein the common trait includes a common message type.

8. The method of claim 1, wherein the common trait includes a common subject.

9. The method of claim 1, wherein the common trait includes at least one word common to the first message and the second message.

10. The method of claim 1, wherein said deleting the second message includes deleting the second message without playing the second message on the telephone.

11. The method of claim 1, wherein the unified messaging system is further configured to process facsimile and pager messages.

12. The method of claim 1, further comprising:

receiving a series of touch tones corresponding to a particular search term from the telephone;

generating an index of words that are contained in messages stored in the email server in accordance with a degree of similarity to the search term;

sending the index of words to the telephone; and wherein said receiving the command from the telephone includes receiving a selection of at least one of the indexed words from the telephone.

13. The method of claim 1, further comprising sending a voice menu list of command options to the telephone.

14. The method of claim 1, further comprising storing new messages in the email server.

15. The method of claim 1, wherein said deleting the first message includes deleting the first message from the email server.

16. The method of claim 1, further comprising:

playing a fourth message on the telephone after said deleting the third message;

receiving a second command from the telephone instructing the unified messaging system to delete only the fourth message; and deleting only the fourth message.

17. A method, comprising:

operating a unified messaging system configured to process email and voicemail messages, wherein the system is operatively coupled to a telephone by a public switched telephone network;

transmitting a first message with the unified messaging system over the public switched telephone network to the telephone;

receiving a command from the telephone instructing the unified messaging system to delete all messages that have a trait in common with the first message;

deleting the first message with the unified messaging system;

determining with the unified messaging system that an email message on the email server has the trait in common with the first message, wherein the email message has content that differs from the first message; and deleting the email message from the email server in response to said determining without transmitting the email message to the telephone.

18. The method of claim 17, wherein the first message is an email message.

19. The method of claim 18, wherein said deleting the first message includes deleting the first message from the email server.

20. The method of claim 18, further comprising converting text of the first message to speech prior to said transmitting the first message.

21. The method of claim 17, further comprising:

receiving a series of touch tones corresponding to a particular search term from the telephone;

generating an index of words that are contained in messages stored in the email server in accordance with a degree of similarity to the search term;

sending the index of words to the telephone; and wherein said receiving the command from the telephone includes receiving a selection of at least one of the indexed words from the telephone.

22. The method of claim 17, further comprising:

determining with the unified messaging system that a second email message on the email server has the trait in common with the first message, wherein the second email message has content that differs from the first message; and deleting the second email message from the email server without transmitting the email message to the telephone.

23. The method of claim 17, further comprising:

determining with the unified messaging system that a second email message on the email server does not have the common trait with the first message; and transmitting the second email message from the email server to the telephone.

24. An apparatus, comprising:

an email server;

a unified messaging system operatively coupled to the email server, wherein the unified messaging system is operable to process voicemail and email messages, wherein the unified messaging system is operable to process communications with a telephone over a public switched telephone network;

the unified messaging system being operable to play a first message over the public switched telephone network on the telephone;

the unified messaging system being operable to receive a command from the telephone instructing the unified messaging system to delete all messages that have the common trait with the first message;

the unified messaging system being operable to delete the first message in response to the command; and the unified messaging system being operable to delete an email message from the email server in response to determining that the email message has the common trait in common with the first message, wherein the email message and the first message were received at different times.

25. The apparatus of claim 24, wherein the first message includes a voicemail message.

26. The apparatus of claim 24, wherein the first message includes an email message.

27. The apparatus of claim 24, further comprising:

the public switched telephone network; and the telephone operatively coupled to the unified messaging system over the public switched telephone network.

28. The apparatus of claim 24, wherein the unified messaging system is configured to convert text to speech.

29. The apparatus of claim 24, wherein the common trait includes a combination of different trait types.

30. The apparatus of claim 24, wherein the unified messaging system is operable to delete a second email message from the email server in response to determining that the second email message has the common trait in common with the first message.

31. An apparatus, comprising:

an email server;

a unified messaging system operatively coupled to the email server, wherein the unified messaging system is operable to process voicemail and email messages wherein the unified messaging system is operable to process communications with a telephone over a public switched telephone network;

the unified messaging system being operable to play a first message over the public switched telephone network on the telephone;

the unified messaging system being operable to receive a command from the telephone instructing the unified messaging system to delete all messages that have the common trait with the first message;

the unified messaging system being able to delete the first message in response to the command;

the unified messaging system being operable to delete an email message from the email server in response to determining that the email message has the common trait in common with the first message; and wherein the first message includes a facsimile message.

* * * * *

UNITED STATES PATENT AND TRADEMARK OFFICE
CERTIFICATE OF CORRECTION

PATENT NO. : 6,944,272 B1
DATED : September 13, 2005
INVENTOR(S) : Thomas

It is certified that error appears in the above-identified patent and that said Letters Patent is hereby corrected as shown below:

Column 11,
Line 31, please change "determining fourth message from the email server does" to
-- determining a fourth message from the email server does --.

Column 14,
Line 18, please change "operable to process voicemail and email messages" to
-- operable to process voicemail and email messages, --.

Signed and Sealed this

Eighth Day of November, 2005

JON W. DUDAS
*Director of the United States Patent and Trademark Office*